United States Patent

[11] 3,599,012

[72] Inventor Norman Green
Timonium, Md.
[21] Appl. No. 799,336
[22] Filed Feb. 14, 1969
[45] Patented Aug. 10, 1971
[73] Assignee The Bendix Corporation

[54] BINARY COUNTER CIRCUITS
15 Claims, 4 Drawing Figs.

[52] U.S. Cl. 307/224, 307/225, 307/282, 235/92
[51] Int. Cl. H03k 23/04
[50] Field of Search 235/92; 328/46, 48; 307/220, 224, 282, 225

[56] References Cited

UNITED STATES PATENTS

| | | | |
|---|---|---|---|
| 2,810,518 | 10/1957 | Dillon et al. | 235/92 X |
| 2,977,485 | 3/1961 | Olsen | 307/282 X |
| 3,132,265 | 5/1964 | Welken et al. | 307/282 X |
| 3,307,045 | 2/1967 | Paivinen | 307/282 |

*Primary Examiner*—John S. Heyman
*Attorneys*—Plante, Arens, Hartz, Hix & Smith, Lamb, Bruce L., William G. Christoforo and Lester L. Hallacher ABSTRACT: A binary counter includes a number of cascaded flip-flop stages, each stage having an input transformer, the primaries of which are serially connected, in the ladder form, to one another across the output terminals of a constant current pulse generator. Each transformer secondary coil is connected to an associated flip-flop toggle input. The low voltage side of each primary winding, in addition to being connected to the low voltage side of the succeeding primary winding, is also connected to the low voltage side of the constant current pulse generator through a stage associated switching transistor. The transistor is biased on or off by the signal appearing on one of output terminals of the transistor's associated flip-flop. Thus, an input pulse from the constant current pulse generator, will be applied to the primary winding ladder down to the stage whose associated transistor is biased on, at which point the pulse is returned to the pulse source. If the switching transistors are turned on by a logical "0" in their associated flip-flops the circuit will operate as an incrementer, while a circuit whose switching transistors are turned on by a logical "1" in their associated flip-flops will operate as a decrementer to respectively add or subject the applied pulse to the count stored in the cascaded flip-flops.

INVENTOR
NORMAN GREEN

BY William G. Christoforo
ATTORNEY

INVENTOR
NORMAN GREEN

BY William G. Christoforo
ATTORNEY

INVENTOR
NORMAN GREEN
BY William G. Christoforo
ATTORNEY

BINARY COUNTER CIRCUITS

BACKGROUND OF THE INVENTION

Binary up-down counters have long been known and basically are comprised of a cascade of binary stages with an input terminal at one end of the cascade to receive pulses which are to be counted. The Q or $\overline{Q}$ output terminal of one binary stage is coupled to the input trigger of the next binary. These counters may be designed to counter either forward, backward or may be made reversible, that is they be made to reverse direction when predetermined end counts are reached. Basically, forward counting is accomplished by connecting the trigger input of a succeeding binary stage to the Q output terminal of the preceding binary stage while reverse counting is accomplished by connecting the trigger output of the succeeding binary stage to the $\overline{Q}$ output terminal of the preceding binary stage. Reversible counters are provided with a gating means which responds to the aforementioned predetermined counts to gate the proper Q and $\overline{Q}$ output terminals to the trigger input terminals to accomplish the desired direction of count.

During the operation of either the forward or reverse counters, counting within a counter in response to a single input pulse precedes sequentially, stage by stage, until the first output terminal in the cascade, starting from the input terminal, attains a level which will not cause the succeeding binary stage to toggle. The time required for a counter to attain a new count after an input pulse has been applied to the input terminal can, thus, be as long as the time required for each binary stage to change state sequentially. For a 16-stage counter whose binary elements are comprised of high-quality, rapid switching transistors having typical switching times of 10 nanoseconds the total counter change time will be in excess of 160 nanoseconds. It is an object of this invention to provide a binary counter having a substantially shorter counter change time than is possible using conventional binary counter design.

SUMMARY OF THE INVENTION

To increment a first binary number by a second binary number it is necessary to add the second number to the first. To decrement a first binary number by a second binary number it is necessary to subtract the second number from the first. For example, to increment a binary number by unity, one must be added to the number, while to decrement a binary number by unity, one must be subtracted from the number. In binary notations, the general rule for incrementing a binary number by unity may be stated as follows:

1. Starting at the right (least significant bit), locate the first zero.
2. Change this zero to a one and change all ones to the right of this zero to zeros.
3. All bits to the left of the first zero remain unchanged.

Example

To add one to 0011 (decimal 3):

Locate first zero from right 0 0 1 1

Change to one
Change to zeros

Performing the indicated operation yields 0100 (decimal 4).

To increment a binary number by two, the same procedure may be used except that the least significant bit remains unchanged and is ignored when locating the first zero.

Example

To add two to 1010 (decimal 10):

Ignore least significant bit
Locate first zero from right 1 0 1 0

Change to one
Change to zero

Performing the indicated operations yields 1100 (decimal 12).

To increment a binary number by four, the same procedure is used, except that the least and next to least significant bits both remain unchanged and are ignored when locating the first zero Example To add four to 10101 (decimal 21):

Ignore these bits
Locate first zero 1 0 1 0 1

Change to one
Change to zero

Performing the indicated operation yields 11001 (decimal 25).

To decrement a binary number by unity, one must be subtracted from the number. An example of such a subtraction is illustrated below.

Binary notation: 0100—0001=0011

To subtract one from a binary number, the following procedure may be employed:

1. Starting at the right (least significant bit) locate the first one.
2. Change this one to a zero and change all the zeros to the right of this one to ones.
3. All bits to the left of the first one remain unchanged.

Example

To subtract one from 0100 (decimal 4):

Locate first one from right 0 1 0 0

Change to zero
Change to ones

Performing the indicated operation yields 0011 (decimal 3).

It can be seen that the rules for incrementing and decrementing are identical except that zeros are replaced by ones.

Thus, in applying these simple rules for incrementing and decrementing, if the states of the various binary elements comprising a counter can be examined simultaneously and the states of each can be altered in accordance with this examination simultaneously, then a new, rapid means of in incrementing and decrementing can be devised. Thus, an object of this invention is to devise a new, rapid acting binary incrementer or decrementer.

It is another object of this invention to develop a rapidly acting binary counter which can easily be made reversible.

Another object of this invention is to provide a binary counter in which all binary stages whose states will be altered by incrementation or decrementation of the counter will be altered essentially simultaneously.

A further object of this invention is to devise a counter of the type described which can be made from readily available circuit elements.

The basic circuit of this invention which will be more fully described below is comprised of a number of cascaded stages, each stage having an input transformer, the primaries of which are serially connected, in ladder form, to one another across the output terminals of a constant current pulse generator from which constant current pulses are applied to the circuit. Each transformer secondary coil is connected to an associated binary element toggle input while the low voltage side of each primary transformer winding, in addition to being connected to the high voltage end of the succeeding primary winding, is also connected to the low voltage side of the constant current pulse generator through a stage associated switching transistor which is biased on or off by the signal appearing on one of its stage associated binary element output terminals. Thus, an input pulse is applied to the primary winding ladder down to that state whose associated transistor is biased on, at which point the pulse is returned to the pulse source. The pulse is applied to the transformer ladder first at the transformer associated with the least significant bit binary stage and then through the primary winding associated with succeedingly more significant bits. If the switching transistors are turned on by a logical "0" in their associated binary elements then the circuit will operate as an incrementer, while a circuit whose switching transistors are turned on by a logical "1" in their associated binary elements will operate as a decrementer.

In addition to the earlier mentioned objects, other objects will become apparent in the following description. The accompanying drawings which form a part hereof are shown by way of illustration of the various embodiments of the invention and how it may be practiced.

DESCRIPTION OF THE PREFERRED EMBODIMENTS

Figure 1:
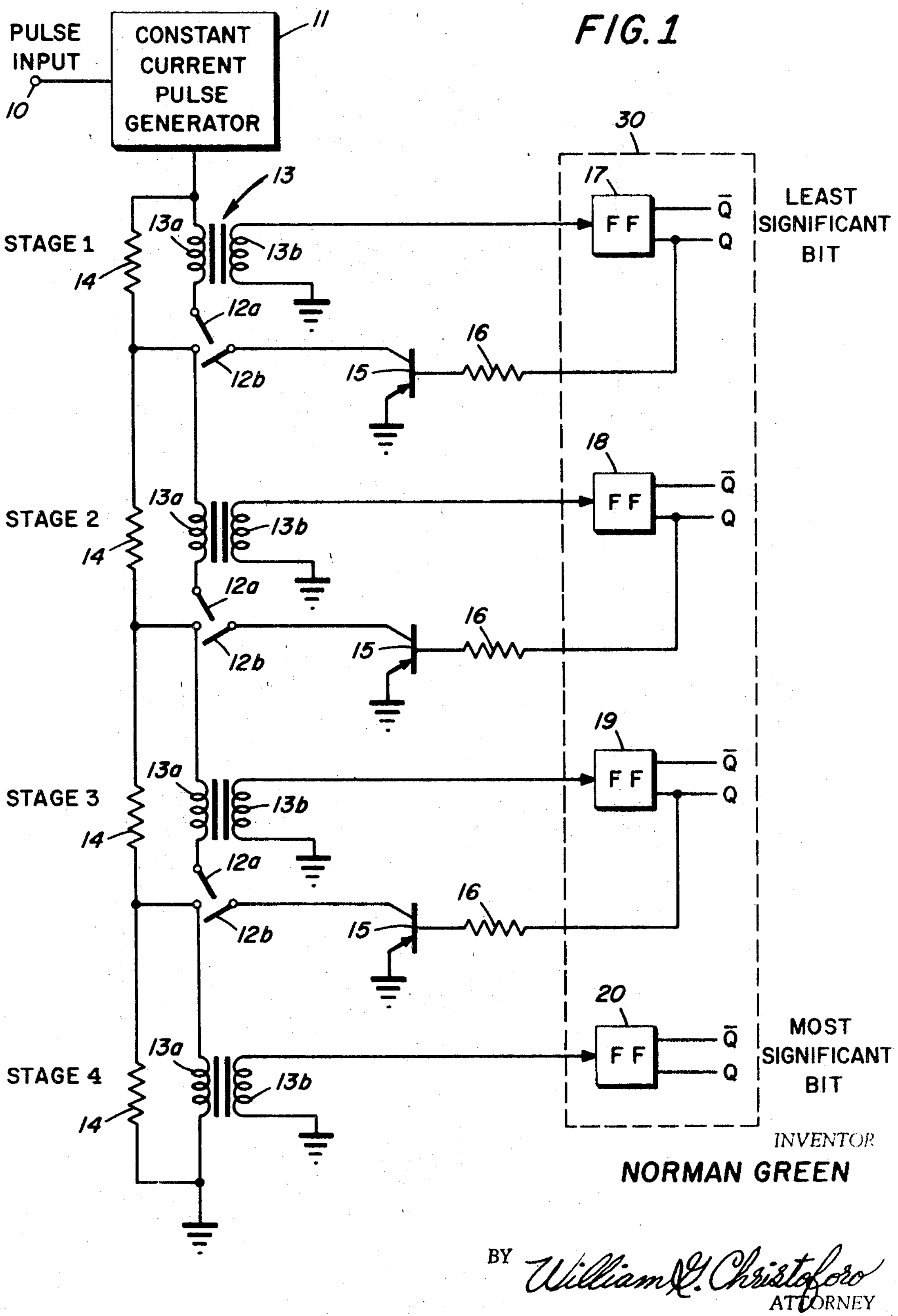
FIG. 1 is a simplified schematic diagram of a circuit which may be operated as either an incrementer or a decrementer.

Referring to FIG. 1, a circuit which may be used as an incrementer or decrementer is seen to be comprised of a cascade of stages, 1 to 4, each of which with the exception of the last stage is comprised of a transformer 13, a resistor 14 which is connected in shunt with primary transformer winding 13*a*, a switching transistor 15 having a collector-emitter circuit connected through switch contacts 12*a* and 12*b* between the low voltage end of primary winding 13*a* and ground, a binary element, for example, flip-flop 17, which has its Q output terminal connected through resistor 16 to the base electrode of transistor 15. The secondary winding 13*b* of transformer 13 is connected between the toggle terminal on its stage associated flip-flop and ground. Transistor 15 and resistor 16, as well as switch contacts 12*a* and 12*b*, are omitted from the last stage for reasons which will be made clear below. The primary windings are serially connected in a ladder configuration between a constant current pulse generator 11 and ground.

Flip-flops 17 to 20 comprise a flip-flop register 30 which is to be incremented or decremented. Register readout is taken from the flip-flop output terminal when the circuit is used as an incrementer while register readout is taken from the flip-flop $\overline{Q}$ output terminal if the circuit is to be used as a decrementer.

Operation of the circuit in FIG. 1 is as follows: Assuming the circuit is to count pulses one at a time, all switches 12*a* and 12*b* will be closed. A pulse to be counted in register 30 is applied to terminal 10 and triggers the constant current pulse generator 11 to generate a constant current pulse. It will be remembered that when the circuit is used as an incrementer, output is taken from flip-flop Q output terminal. Additionally, in this embodiment logical "1" will be assumed to be above ground potential while logical "0" will be assumed to be a voltage sufficiently below ground potential so that a logical "0" on a flip-flop Q output terminal will forward bias the stage associated switching transistor. The constant current pulse will thus travel from constant current pulse generator 11 through the primary windings 13*a* of each stage, one to four, only if each transistor 15 is back biased, that is, only if the output of each register flip-flop is in logical "1" state. Each transistor 15 operates as a switch that short circuits the current pulse when turned on by a logical "0" output terminal of its associated flip-flop. Thus, when operated as an incrementer, the first logical "0" in the register readout starting with the least significant bit, produces a short circuit on the ladder comprised of primary windings 13*a* and prevents the constant current pulse from propagating beyond this short circuit. Each transformer above the short circuit, upon application of the constant current pulse, produces an output pulse at its secondary winding 13*b*. Each flip-flop receiving a pulse changes state. Remembering the rules developed earlier for incrementing by unity, it can be seen that the register is thus incremented by unity.

Remembering further the rules for incrementing by two, it should now be obvious that opening switches 12*a* and 12*b* in stage 1 permits the constant current pulse to bypass this stage and to thus increment the register by two. In like manner, the register can be incremented by four with a single constant current pulse by opening switches 12*a* and 12*b* both stages 1 and 2, while a single constant current pulse will increment the register by eight if switches 12*a* and 12*b* are opened in stages 1, 2 and 3. Although only a four-stage incrementer is shown it should be obvious that any number of stages could be employed and that assuming sufficient stages, the resulting incrementer can be incremented by any number $2^n$, where $n$ is an integer, by a single constant current pulse.

For use as a decrementer it is merely necessary to take the register output from the flip-flop $\overline{Q}$ output terminals. In this case, a logical "1" at a flip-flop $\overline{Q}$ output terminal causes the stage associated switching transistor to be forward biased by the logical "0" on the output terminal thus preventing the constant current pulse from propagating past this stage as was also the case when the circuit was used as in incrementer. Thus the decrementing rules developed earlier are obeyed. That is, all the logical "1"s from the least significant bit to the first logical "0" are changed to logical "0"s and the first logical "0" is changed to logical "1". To decrement by any number $2^n$, where $n$ is an integer, the switches 12*a* and 12*b* are manipulated in the same manner as when the circuit is operated as in incrementer.

Figure 2:
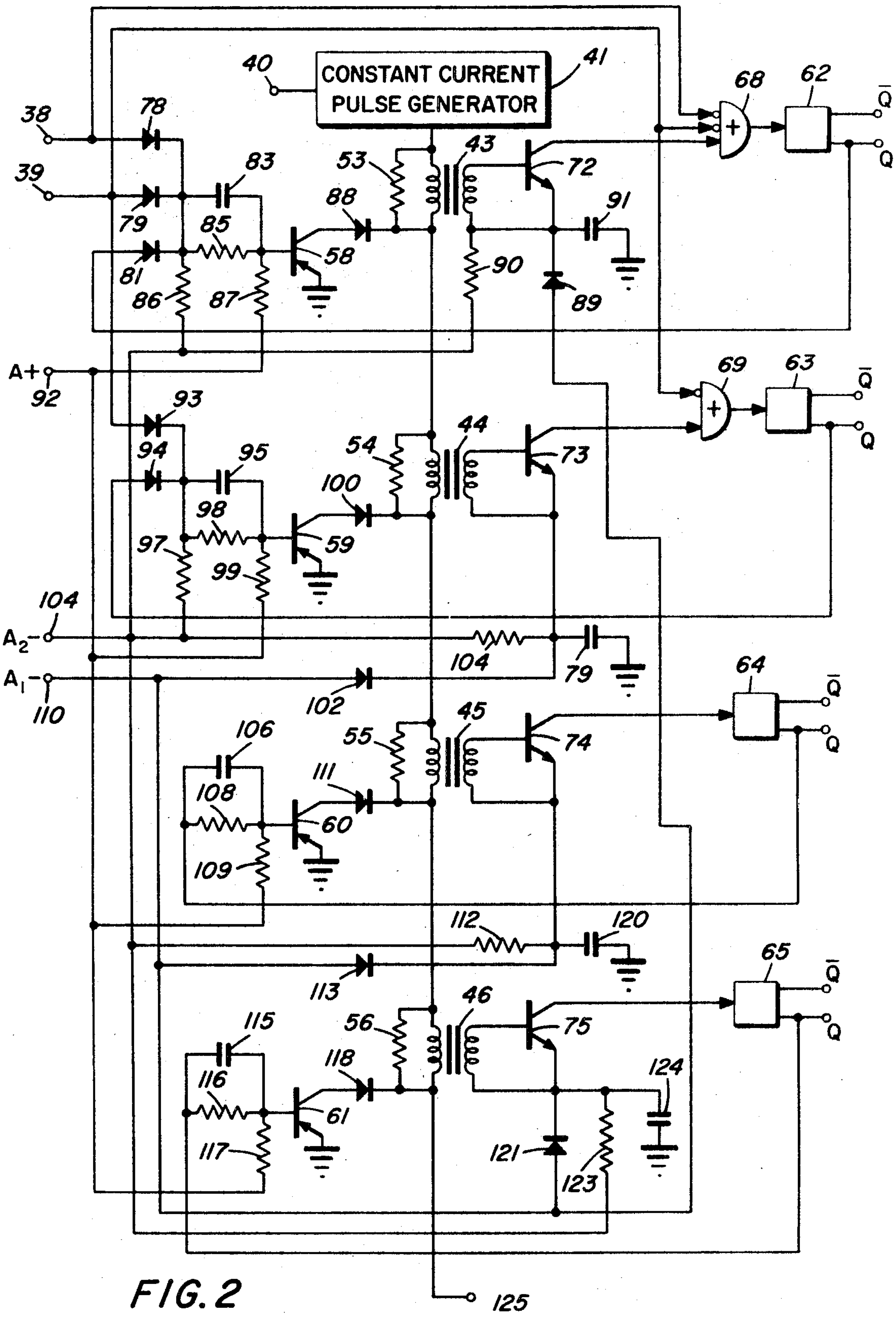
FIG. 2 is a schematic diagram showing my invention in greater detail.

Referring now to FIG. 2 where my invention is seen in greater detail, a pulse to be counted in the register comprised of flip-flops 62 to 65 is applied to terminal 40 and triggers constant current pulse generator 41 to generate a constant current pulse which is applied across the ladder configuration of the primary windings of transformer 43 to 46. Switching transistors 58 to 61, if forward biased, short circuit the constant current pulse. It will be noted that the Q output terminal of flip-flop 62, which is the least significant bit flip-flop, is connected through diode 81 and a parallel arrangement of capacitor 83 with resistor 85 to the base terminal of transistor 58. In like manner, the Q output terminal of flip-flop 63, which is the second least significant bit flip-flop, is connected through diode 94 and capacitor 95 and resistor 98 to the base electrode of transistor 59, while the Q output terminal of flip-flop 64, which is the third least significant bit flip-flop, is applied through resistor 108 and capacitor 106 to the base electrode of transistor 60 and the Q output terminal of flip-flop 65, which in this embodiment is the most significant bit flip-flop, is applied through the parallel arrangement of capacitor 115 and resistor 116 to the base electrode of transistor 61. The base electrodes of the switching transistors 58 to 61 are also resistively coupled to the positive voltage source impressed on terminal 92 through resistors 87, 99, 109 and 117, respectively, to insure that the switching transistors are cut off when the base inputs to these transistors are above ground potential, or in other words, when the signal on the switching transistors associated flip-flop Q output terminal is a logical "1". Capacitors 83, 95, 106 and 115 are speed-up capacitors which reduce their associated switching transistor turn on and turnoff times. Resistors 85, 98, 108 and 116 provide the base drive current for their corresponding transistors. Transistor 72 is an output stage which amplifies any signal coupled onto the secondary winding of transformer 43. The emitter of transistor 72 is clamped to the negative voltage source impressed across terminals 104 and 110 by diode 89 and resistor 90. Capacitor 91 is a bypass capacitor which holds the emitter of transistor 72 at a constant voltage during switching. A pulse from transformer 43 applied to the base of transistor 72, turns that transistor on to produce a collector pulse which is applied to gate 68, which, if uninhibited, passes a trigger pulse to flip-flop 62. Transistors 73, 74 and 75 function in the same manner as transistor 72 and have their emitter terminals clamped to the negative voltage source across terminal 104 and 110 by diode 102 and resistor 104, diode 113 and resistor 112 and diode 121 and resistor 123, respectively. Additionally, capacitors 79, 120 and 124 perform the same function for their associated transistor as capacitor 91 does for transistor 72. Diodes 88, 100, 111 and 118 are provided to respectively protect their associated switching transistors from reverse collector current.

The operation of the circuit of FIG 2 to increment or decrement by unity should now be obvious. Briefly, as aforementioned, when operated as an incrementer the circuit output is taken from the Q output terminals of the flip-flop register, while when operated as a decrementer circuit output is taken from the $\overline{Q}$ outputs of the flip-flop register. To increment or decrement by unity no signals are applied to terminals 38 to 39 so that gates 68 and 69 are uninhibited To increment or decrement by two, a multiple count signal is applied at terminal 38 at the same time the pulse which is to increment or decrement the counter by two is applied to terminal 40. The characteristics of the multiple count signal applied to terminal 38 must be such that it disables transistor 58 while at the same time inhibiting gate 68. The constant current pulse now proceeding through the transformer ladder cannot affect the state of flip-flop 62 so that the rules for incrementing or decrementing by two have been obeyed. To increment or decrement by four, a multiple count signal is applied to terminal 39, thus disabling transistors 58 and 59 and inhibiting gates 68 and 69 at the same time the constant current pulse is applied to the transformer ladder. The settings of flip-flops 62 and 63 are, thus, not affected and the counter will change by four. Of course, following my teachings, it is now possible to provide a counter of any length which can be incremented or decremented by any number equal to $2^n$.

An interesting byproduct is produced during the use of this circuit by the addition of switching transistor 61 to the last stage. This is in the form of a signal which appears on terminal 125 when the register comprised of flip-flops 62 to 65 is filled. This is the only time that the constant current pulse will proceed completely through the transformer train so as to produce the aforementioned signal at terminal 125. This signal can be usefully employed such as by resetting the flip-flop register to a predetermined number, providing a signal to indicate that the register is full, etc. Of course, terminal 125 can be grounded, in which case the circuit will continually count through the maximum count and back to zero.

The resistors shunting the transformer windings, is this figure, for example, resistors 53, 54, 55 and 56 provide essentially a resistive load to the pulse generator and thus allow rapid propagation of the constant current pulse through the transformer ladder. Additionally, the aforementioned resistors provide equal transformer output voltages and control transformer primary magnetizing current and subsequent fly-back voltage when a constant current pulse terminates. Their use in any particular circuit is at the option of the circuit designer and will generally be dictated by consideration such as the electrical characteristics of the transformers and the input electrical characteristics of the binary elements.

Figure 3:
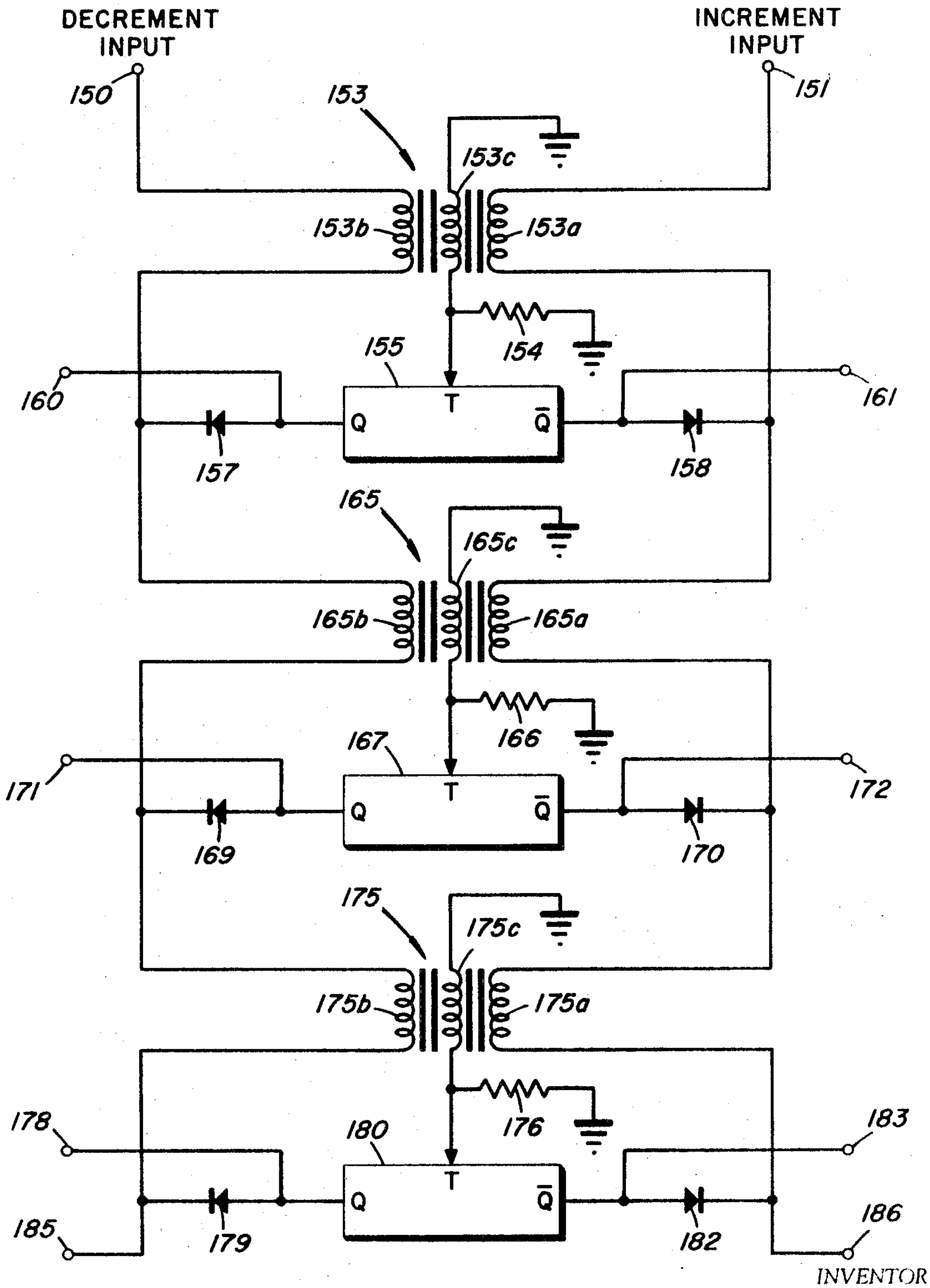
FIG. 3 illustrates a three-stage incrementing or decrementing counter.

Referring now to FIG. 3, a three-stage counter is illustrated, but any number of stages may be used, which can be used to both increment and decrement. The circuit shown is comprised of three transformers 153, 165, and 175, each having two primary windings, for example, windings 153*a* and 153*b*, and a single secondary winding, for example, winding 153*c*. Primary windings 153*a*, 165*a* and 175*a* are serially connected between increment input terminal 151 and terminal 186, while primary windings 153*b*, 165*b*, and 175*b* are connected between decrement input terminal 150 and terminal 185. A three-stage data register is comprised of flip-flops 155, 167 and 180 with the register decrement information appearing on $\overline{Q}$ output terminals thereof and taken from output terminals 161, 172 and 183 where the least significant bit appears on terminal 161 and the most significant bit appears on terminal 183. Increment information is taken from the Q output terminals and is reproduced on terminals 160, 171, and 178, the least significant bit appearing on terminal 160 and the most significant bit appearing on terminal 178. The secondary winding of a typical transformer is connected between ground and the toggle input terminal of its associated flip-flop, for example, secondary winding 153*c* is connected between ground and the toggle input terminal of flip-flop 155. For the diode polarity shown, a negative constant current pulse applied at terminal 150 will cause the counter to decrement by unity while a negative constant current pulse applied to terminal 151 will cause the counter to increment by unity. For the circuit shown flip-flop logical "0" voltage level is negative and logical "1" voltage level is zero volts. For flip-flops having a positive voltage logic level, the diodes must be reversed and a positive current pulse used to both decrement and increment. The source impedance of the constant current pulse (not shown) must be high enough to provide essentially a constant current pulse to the transformer ladder Diodes 158, 170 and 182 prevent the increment transformer windings from being short circuited by the flip-flop outputs during decrementation. Similarly, diodes 157, 169 and 179 prevent decrement transformer windings from being short circuited by flip-flop outputs during incrementation. In addition, the diodes are reverse biased and disconnect the flip-flop output from the transformer ladder when the flip-flop output is negative.

Circuit operation is similar to the operation of the incrementer circuits previously described except that the increment transformer windings are connected to the $\overline{Q}$ output terminal of the flip-flop through diodes 158, 170 and 182. The decrement transformer windings are connected in like manner through diodes 157, 169 and 179 to the Q sides of the flip-flops. Upon application of a constant current pulse to terminal 151, the counter will count up, that is, increment by one count, since the transformer primary current will be conducted to ground by the least significant flip-flop storing a logical "0" at its Q output terminal since at that time the flip-flop will be storing a logical "1" at its Q output terminal. To prevent the flip-flops from changing state before the current pulse can propagate down the entire transformer ladder, trailing edge triggering is used. During the application of a trigger, pulse energy is stored in the transformer primary inductances. Resistors 154, 166, and 176 are of equal value and thus provide equal voltages to each transformer primary. The appropriate flip-flops are triggered at the termination of the current pulse during the transformer recovery time. The choice of leading edge or trailing edge triggering is a design option determined by practical considerations of circuit delays. Both triggering methods have been successfully implemented.

When the counter shown contains the binary number 111 (maximum count for this circuit) the constant current pulse applied at input terminal 151 will be reproduced at terminal 186. This constant current pulse at terminal 186, which indicates the counter has attained its maximum count, is a useful signal in many digital systems and is produced without the additional decoding usually required when using a conventional binary counter. A load impedance may be connected to terminal 186 to convert the constant current pulse to a voltage This load impedance should be large compared to the impedance of the current source used to drive the transformer ladder. This prevents flip-flop triggering and allows the counter to stop at 111. If the load impedance is made zero (short circuited at terminal 186) then the counter will not stop at the 111 count but will reset to 000 and continue to count in response to increment current pulses applied at terminal 151

The circuit responds to constant pulses at the decrement input terminal 150 in a similar manner. When the counter contains the binary number 000, a decrement circuited, at terminal 150 will produce a voltage across a load impedance (not shown) at terminal 185. If this impedance is large, flip-flop triggering will not occur and the 000 count will not change If the load impedance at terminal 185 is short circuited, the counter will not stop at the 000 count but will reset to 111 and continue to count down in response to decrement current pulse at terminal 150.

Figure 4:
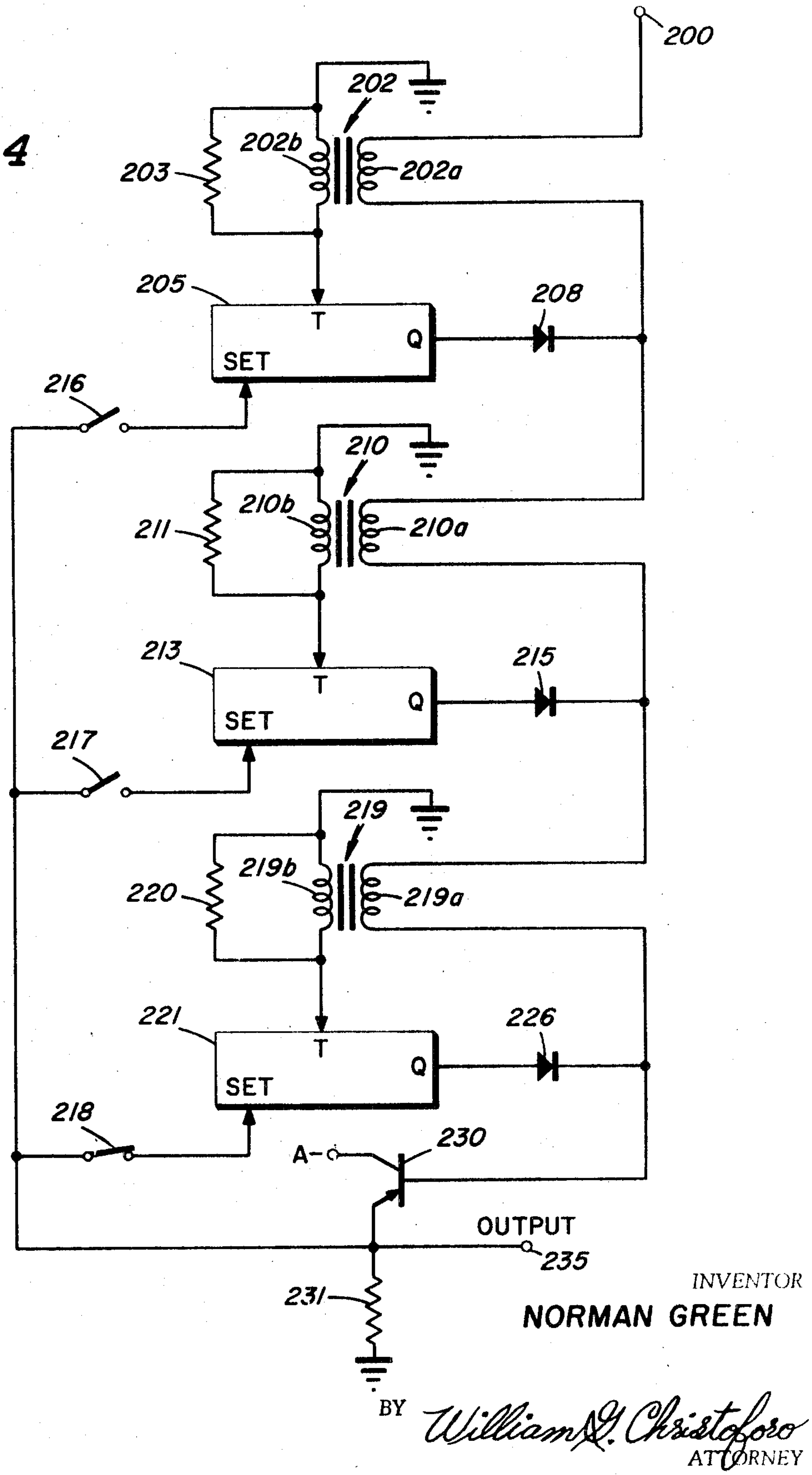
FIG. 4 is a schematic of a frequency divider using the principles of my invention.

FIG. 4 illustrates the use of my invention as a frequency divider and reference should now be made thereto. The circuit shown therein is comprised of transformers 202, 210 and 219 having primary windings 202a, 210a, 219a respectively, serially connected between input terminal 200 and the base electrode of emitter follower transistor 230. The secondary winding of each transformer is shunted by a resistor, for example, resistor 203 shunts secondary winding 202b, resistor 211 short-circuited, secondary winding 210b, and resistor 220 shunts secondary winding 219b. A three-stage data register is shown comprised of flip-flops 205, 213, and 221. Each transformer secondary winding is connected between ground and the toggle input terminal of its associated flip-flop, for example, secondary winding 202b is connected between ground and the toggle input terminal of flip-flop 205. The circuit shown primarily operates as a decrementer similar in principle to the decrementing operation of the circuit shown in FIG. 3. Constant current pulses applied to terminal 200 travel down the primary winding ladder until short circuited, through one of the diodes 208, 215 or 226, by a logical "1" in the diode associated flip-flop so as to cause the data register to decrement from some predetermined number to 000, at which time, as was shown in the description of the circuit of FIG. 3, an output pulse appears at the end of the primary winding ladder, which in this case is at the base of emitter follower 230 which provides a high impedance load for the transformer primary winding ladder. Resistor 231 is a discharge path for stray and load capacitances. The resultant signal on the emitter electrode of emitter follower 230 is taken at terminal 235 as the frequency divider output and is also applied through switches 216, 217 and 218, if closed, to the set terminals of flip-flops 205, 213, and 221 respectively. A signal applied to a flip-flop set terminal causes a logical "1" to appear at the flip-flop's Q output terminal. Thus, when the data register attains a 000 count, an output signal appears at the base of emitter follower 230 thus causing a voltage pulse at the emitter electrode and terminal 235 and, for the circuit shown, sets the Q output terminal of flip-flop 221 to logical "1". The data register comprised of flip-flops 205, 213 and 221 now contains the initial condition 100 (decimal 4). The application of four subsequent constant current pulses at terminal 200 will produce a 000 state in the data register. A fifth constant current pulse will produce an output voltage pulse across resistor 231 and additionally to terminal 235. The voltage pulse will also be used to set the data register into its initial condition once again. Thus, the circuit has divided the frequency of the input pulses at terminal 200 by five. That is, input frequency is divided by a number which is one greater than the initial setting of the data register. Switches 216, 217 and 218 may, of course, be manipulated to change the initial condition number set into the data register. For example, with switches 216 and 218 open and switch 217 closed, the binary number 010 is set into the data register. This corresponds to the decimal number 2. In this condition, the circuit will divide the input frequency by 3, which is one more than the number set into the data register.

As has been mentioned, the operation of this circuit is similar to the operation of the circuit of FIG. 3 when decrementing. Briefly, an input pulse applied to terminal 200 will move through the primary winding ladder comprised of primary windings 202a, 210a and 219a until grounded by a flip-flop Q output terminal in the logical "1" state through its associated diode either 208, 215 or 226.

Although only a three-stage frequency divider is shown, it should be obvious to one skilled in the art that the circuit may be expanded to include any number of flip-flop stages. Similar modifications and alterations of the embodiments of my invention can be made by one skilled in the art without departing from my teachings.

The invention claimed is:

1. A counting circuit having a plurality of stages including a first stage for providing a least significant bit and a last stage for providing a most significant bit, comprising:

means for generating a constant current electrical pulse;

a plurality of transformers having first windings and second windings responsive to pulsed signals on said first winding for generating secondary pulse signals, one of said transformers being included in and associated with each said counting stage, said first windings being serially connected to receive sequentially said constant current electrical pulse from said first to said last stage;

a plurality of bistable elements having input toggle terminals and Q and $\bar{Q}$ output terminals, one of said bistable elements being included in and associated with each said counting stage and having its input toggle terminal connected to receive said secondary pulse signals from the second winding of its stage associated transformer; and, a plurality of first switching means, one of said first switching means being included in and associated with each said counting stage except said last stage and responsive to the logical state of its stage associated bistable element for shunting said constant current pulse back to said generating means after said pulse has traversed through its associated first winding.

2. A counting circuit as recited in claim 1 wherein each said first winding includes a first end at which said constant current electrical pulse enters said first winding and a low end at which said pulse leaves said first winding and wherein each said first switching means comprises a switching transistor having an emitter-collector circuit connected to return said pulse from said second end to said generating means, and a base electrode; and, means for connecting said base electrode to said Q output terminal of its stage associated bistable element.

3. A counting circuit as recited in claim 2 with additionally a plurality of resistors for shunting said first and second ends.

4. A counting circuit as recited in claim 3 with additionally a plurality of second switching means, one of said second switching being included in and associated with predetermined counting stages, for disconnecting said associated switching transistor from said second end and disabling said stage associated secondary pulse signal.

5. A counting circuit as recited in claim 4 wherein each said second switching means comprises:

means for generating multiple count signals;

means connecting said second winding to its associated bistable element toggle terminal, said connecting means inhibited by said multiple count signals; and means responsive to said multiple count signals for inhibiting its stage associated switching transistor.

6. A counting circuit as recited in claim 2 wherein said first switching means includes a last stage first switching means included in and associated with said last counting stage and responsive to the logical state at said last stage binary element for shunting said constant current pulse back to said generating means after said pulse has traversed through said last stage first winding.

7. A counting circuit as recited in claim 6 with additionally a high impedance electrical load connected between said last stage first winding second end and said generating means.

8. A counting circuit as recited in claim 2 wherein said connecting means comprises a parallel R—C circuit.

9. A counting circuit as recited in claim 6 with additionally a plurality of diodes connected in the emitter-collector circuit of said transistors between said transistors and said seconds ends.

10. An electrical counting circuit having a plurality of counting stages comprising:

a first input terminal;

a first output terminal;

a second input terminal;

a second output terminal;

a plurality of transformers each being associated with one said counting stage and having first, second and third windings, said third winding being responsive to pulsed signals on said first or second windings for generating secondary pulse signals, said first windings being serially connected from a low end of a preceding first winding to a high end of a succeeding first winding across said first input and first output terminals, and said second windings being serially connected from a low end of preceding second winding to a high end of a succeeding second winding across said second input and said second output terminals;

a plurality of bistable elements, each being associated with one said counting stage and having a toggle input terminal and Q and $\bar{Q}$ output terminals;

means for connecting said toggle input terminal to its stage associated third winding; and a first plurality of unilateral current means, one being associated with each said counting stage and connected between said Q output terminal and its associated first winding low end; and, a second plurality of unilateral current means, one being associated with each said counting stage, for connecting said $\bar{Q}$ output terminal to its associated second winding low end.

11. An electrical counting circuit as recited in claim 10 wherein said first and second plurality of unilateral current means comprise first and second pluralities of diode means.

12. A frequency divider including an input terminal, an output terminal and a high impedance electrical load having one end connected to said output terminal, said divider having a plurality of stages each said stage comprising:

a bistable element having at least a toggle input terminal, a set input terminal and a Q output terminal;

a transformer having a first winding including a high end and a low end and a second winding means for generating secondary output signals in response to pulse signals in said first winding, said first winding being connected from a low end of a preceding primary winding to the high end of a succeeding primary winding, the primary windings of said plurality of stages being thus connected serially to one another to form a ladder, said ladder being connected between said divider input terminal and the other end of said high impedance electrical load;

means for connecting said second winding means to said toggle input terminal;

unilateral current means for connecting said Q output terminal to said low end; an switch means connected between said high impedance electrical load and said bistable element set input terminal.

13. A frequency divider as recited in claim 12 wherein said second winding means comprises an electrical transformer winding shunted by a resistor.

14. A frequency divider as recited claim 13 wherein said unilateral current means comprises a diode.

15. A frequency divider as recited in claim 12 wherein said high impedance electrical load comprises an emitter follower having an emitter electrode comprising said load one end and a base electrode comprising said load other end.